March 8, 1960 S. PASJACK Re. 24,789

CARTONS

Original Filed June 7, 1954

INVENTOR
STEVE PASJACK

Ernest F. Parker
ATTORNEY

United States Patent Office

Re. 24,789
Reissued Mar. 8, 1960

24,789

CARTONS

Steve Pasjack, Vancouver, British Columbia, Canada, assignor to Unipak Cartons Ltd., Vancouver, British Columbia, Canada Original No. 2,727,653, dated December 20, 1955, Serial No. 434,915, June 7, 1954. Application for reissue December 17, 1957, Serial No. 711,537

(Filed under Rule 47(b) and 35 U.S.C. 118)

9 Claims. (Cl. 220—105)

Matter enclosed in heavy brackets [ ] appears in the original patent but forms no part of this reissue specification; matter printed in italics indicates the additions made by reissue.

My invention relates to improvements in cartons.

The particular object of the invention is to provide a carton fitted with a concealed handle by which the carton and its contents can be carried.

Other objects are to provide that the handle can become accessible by the simple means of slitting a portion of the binding strip which is used to seal the carton after it has been filled with the bottles, jars or other articles, and also to provide a carton which can be returned with the handle undamaged and concealed for reuse in packing new articles and then resealed by another adhesive binding strip.

A still further object is to provide a handle component which also serves as a dividing wall in the formation of the filler cells within the structure.

Other objects will [devolop] *develop* as the specification proceeds.

Referring to the accompanying drawings.

In the drawing[s], *which illustrate the preferred form of invention,* like characters of reference indicate corresponding parts in each figure.

Figure 2:
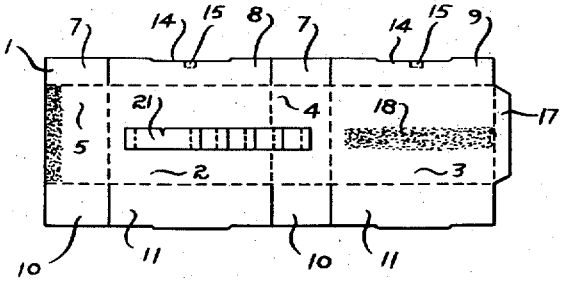
Figure 2 is a plan view of the carton blank.

The numeral 1 indicates a carton blank which is creased to provide side walls 2 and 3, end walls 4 and 5, [top end closures 7, top side closures 8 and 9,] bottom end closures 10 and bottom side closures 11, *all constituting a wall structure, and top end closures 7 and top side closures 8 and 9 all constituting a hingeable top closure.* Each of the top side closures are cut back to form recesses 14 and at the base of one of these recesses a [finger gap] *hingeable tab* 15 is provided. The free end of the [site] *side* wall 3 is provided with an elongated tab 17 which is adapted to be united with the free end of the end wall 5 by a pressure setting resin glue which is preferably used throughout the manufacturing of the carton to knock down form. Glue is applied to the area 18 of the [slide] *side* wall 3 and a similarly positioned area of side wall 2.

Figure 3:
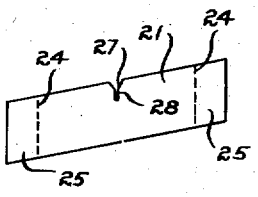
Figure 3 is a perspective view of a filler member.
Figure 4:
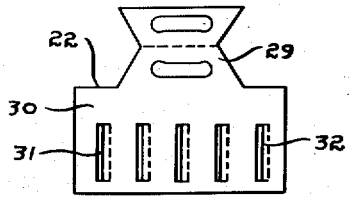
Figure 4 is an elevational view of the handle member.
Figure 7:
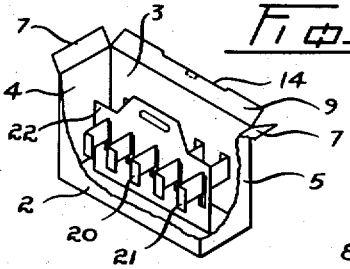
Figure 7 is a perspective view, part broken away, of the carton opened out ready for filling with merchandise.
Figure 1:
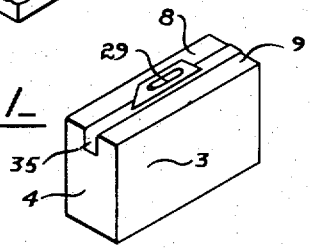
Figure 1 is a perspective view of the finished invention showing the handle withdrawn to carton carrying position.

The filler structure 20, see Figure 7, is formed of filler members 21, see Figure 3, and a handle member 22,

*said members 21 and 22 constituting mutually transverse partition members defining article receiving compartments within the carton.* The filler members 21 are strips of material which are creased as at 24 to define end folds 25 which are adapted to be bent only when the carton is opened into box form as in Figure 7. Each filler member is provided with a V-shaped notch or mouth 27 having at its base a parallel sided gap or throat 28, *said notches 27 being adapted to locate the handle member 22 in relation to said filler members.* The end folds 25 of the filler strips are coated with glue, so that when they are laid down upon one of the areas 18 and the parts pressed together a proper bond will be formed. The handle member 22 [consists of], *constituting a selected partition member, is provided with an extension forming* a hand grip *or handle portion* 29 and a wall portion *having a pair of shoulders,* which portion is provided with a plurality of vertical slots 31, each having an offset side edge 32 which projects beyond the normal plane of the handle member. The slots 31 are [considerably longer] *of a depth greater* than the vertical dimension of the filler members 21 *which are adapted to pass therethrough.*

Figure 5:
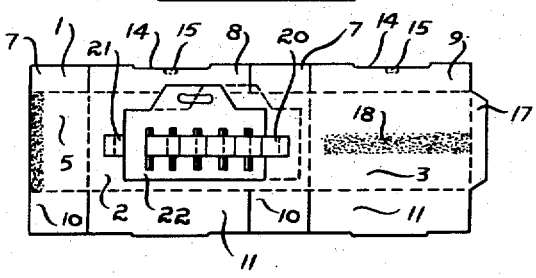
Figure 5 is a plan view of the assembled parts prior to the folding of the blank.
Figure 6:
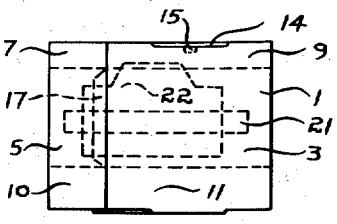
Figure 6 is a plan view of the completely finished carton in the knock down state ready for sale and shipment to the user.
Figure 8:
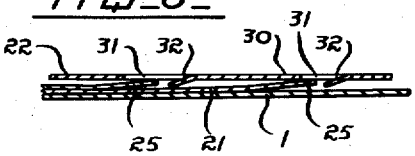
Figure 8 is an enlarged sectional view showing the disposition of carton and filler members as the handle member is being interleaved with said filler members.

In making up the carton, a number of filler members are laid in overlapping arrangement upon the glued area 18 of the side wall 2 *of the wall structure,* with their free ends extended to the right of Figure 5 and being creased as before described with their free ends slightly elevated above their intermediate parts as shown in Figure 8. A handle member is laid down upon said filler members with the offset edges 32 of the slots 31 of the wall portion extending diagonally, so that as said handle portion is moved to the left of Figures 5 and 8, each free end portion of the filler members 21 will pass through one of said slots. When in the position above described the upper end of the grip 29 will be slightly above the upper limit of the side wall 2 *of the wall structure,* but may be aligned therewith by moving the handle [members] *member* so that the upper edges of the vertical slots 31 will enter their respective notches 27 and be lodged in the gaps 28. To complete the knockdown carton it is now only necessary to fold the side wall 3 *of the wall structure* over onto the filler members and the end wall 5 *of the wall structure* over onto the glued tab 17 and press them together to bind all the glued parts to their counterparts.

[The purchaser opens up the knock down carton to rectangular form and closes its bottom portions and the carton is then filled and sealed with a glued tape 35.]

[When the purchaser of a filled carton wishes to use the grip 29, he slits the tape 35 and inserts a finger through the finger gap 15 and lifts said handle until the lower edges of the slots 31 engage the under edges of the filler members.]

*To assembly a carton for filling purposes, a knocked-down carton is opened and the bottom portions 10 and 11 closed and sealed with glue, tape or by means of staples in known manner, the handle member 22 being located within the carton so that the shoulders of said handle member are parallel with the upper edge of the side walls 2 and 3 of the wall structure.*

*After the carton has been filled with the desired contents, the top portions 7, 8 and 9 are folded down and the carton sealed by adhesive or tape 35 extending along and over the recesses 14 existing between the complementary top side closures 8 and 9.*

*When it is desired to carry the carton and its contents, and the top closure is in an undisturbed condition, the user merely pushes downwardly on the hingeable tabs 15 so that they project into the carton and grasps the hand grip or handle portion 29, pulling upwardly so that said handle member 22 will slide upwardly within the recesses*

*14 from a first retracted position in which said handle portion 29 of the handle member 22 lies beneath the top closures 7, 8 and 9 of the carton, to a second operative position in which said handle portion 29 projects above said top closure. It will be obvious that further outward movement of the handle portion 29 of the handle member 22 will be limited when the upper edges of the shoulders on said handle member 22 abut the underside of the top closure.*

*Due to the fact that the filler structure 20 is rigidly secured to the wall structure of the carton, and by virtue of the engagement of the shoulders of the handle member 22 with the underside of the top closure of the carton, the weight of the latter will be evenly distributed throughout for carrying purposes.*

*When it is desired to obtain access to the interior and contents of the carton, the tape 35 is torn away and the top closure of the carton opened.*

*It will be appreciated that once the rigid co-operation of the components forming the top closure of the carton has been removed, due to the removal of the tape 35, the shoulders of the handle member 22 are unlikely, when it is desired again to carry the carton, to abut the under side of the top closure. Thus, further outward movement of the handle portion 29, when the carton is in this condition, is limited, when the carton is lifted by the handle member 22, by the co-operation of the lower edges of the vertical slots 31 of said member 22 with the lower edges of the filler members 21.*

*Thus, it will be appreciated that the invention provides a novel type of carbon which, regardless of whether its top closure is in an undisturbed or disturbed condition, can, together with its contents, be carried by means of an extensible handle normally contained within said carton. In other words, when it is desired to carry the carton after disturbance of the top closure, the user does not have to resort to any action other than merely to grasp the handle portion 29.*

What I claim as my invention is:

[1. A carton having sides and a bottom wall, a filler structure within the carton, said filler structure having a plurality of filler members connected at opposite ends to opposing side walls, and a slidably extensible handle member adapted to be normally wholly enclosed in the carton, said member being supported by the filler members and serving to define article receiving spaces on both sides of the handle member and between the filler members, said filler members having medial slots on their upper edges, and said handle member having a plurality of vertical slots closed at their lower and upper ends, said filler members extending through the vertical slots and said medial slots being adapted to locate the handle member lengthwise of the filler members when said handle member is in normal position, the lower marginal edges of the vertical slots being adapted to bear upwardly onto the lower edges of the filler members to support the carton when being carried by the handle members.]

*2. An enclosed carton of the type having a wall structure comprising side and end walls and a bottom, said carton including a top closure, and mutually transverse partition members defining article receiving compartments therein, and in which one such selected partition member includes a handle portion movable between a first retracted position in which said handle portion lies beneath said top closure and a second operative position in which said handle portion projects above said top closure, at least one other of such partition members having wall engaging portions directly fixed to the wall structure, and means on said selected partition member adapted to engage said one other of such partition members and limit movement of the handle portion outward of such wall structure.*

*3. An enclosed carton as claimed in claim 2 wherein means are provided for locating said selected partition member in relation to said one other of such partition members.*

*4. An enclosed carton as claimed in claim 2 wherein said selected partition member is provided with an extension forming a grip extending, when said selected partition member is in its first retracted position, to the height of the wall structure.*

*5. An enclosed carton as claimed in claim 2 wherein the top closure includes a first pair of top flaps and a second pair of top flaps which are arranged at right angles to, and adapted to overlie, the first mentioned pair of top flaps, said second pair of top flaps meeting, when closed, adjacent the centre of the carton and adapted to be held in closed position by means of a glued tape.*

*6. An enclosed carton of the type having a wall structure comprising side and end walls and a bottom, said carton including a top closure and mutually transverse partition members defining article receiving compartments therein, and in which one such selected partition member includes a handle portion movable between a first retracted position in which said handle portion lies beneath said top closure, and a second operative position in which said handle portion projects above said top closure, shoulders on said handle portion adapted to co-operate with the underside of said top closure to limit further outward movement of such selected partition member, at least one other of such partition members being fixed to mutually opposed side walls of the wall structure, and means on said selected partition member adapted to engage said one other of such partition members and limit movement of the handle portion outward of such wall structure after displacement of said top closure from co-operating relationship with said shoulders.*

*7. An enclosed carton as claimed in claim 2 wherein the means on said selected partition member comprise at least one vertical slot through which the said one other of such partition members passes, said slot being of a depth greater than the depth of said one other of such partition members, whereby, when said selected partition member is moved to its second operative position, such movement will be limited by engagement of the bottom of the slot with the underside of said one other such partition member.*

*8. An enclosed carton as claimed in claim 6 wherein said selected partition member is provided with at least one vertical slot through which the said one other of such partition members passes, said slot being of a depth greater than the depth of said one other of such partition members, whereby, when said selected partition member is moved to its second operative position, such movement will be limited by engagement of the bottom of the slot with the underside of said one other such partition member.*

*9. An enclosed carton as claimed in claim 2 wherein said selected partition member is provided with an extension forming a grip extending, when said selected partition member is in its first retracted position, to the height of the wall structure and wherein the top closure includes a first pair of top flaps and a second pair of top flaps which are arranged at right angles to, and adapted to overlie the first mentioned pair of top flaps, said second pair of top flaps meeting, when closed, adjacent the centre of the carton and adapted to be held in closed position by means of a glued tape, said second pair of top flaps being recessed intermediate the length of their meeting edges to provide an elongated aperture through which the grip of said selected partition member may be withdrawn so as to move said selected partition member to its second operative position.*

*10. An enclosed carton as claimed in claim 6 wherein said selected partition member is provided with an extension forming a grip extending, when said selected partition member is in its first retracted position, to the height of the wall structure and wherein the top closure includes a first pair of top flaps and a second pair of top flaps which*

*are arranged at right angles to, and adapted to overlie, the first mentioned pair of top flaps, said second pair of top flaps meeting, when closed, adjacent the centre of the carton and adapted to be held in closed position by means of a glued tape, said second pair of top flaps being recessed intermediate the length of their meeting edges to provide an elongated aperture through which the grip of said selected partition member may be withdrawn so as to move said selected partition member to its second operative position.*

References Cited in the file of this patent or the original patent

UNITED STATES PATENTS

| | | |
|---|---|---|
| Re. 18,965 | Dugdale | Oct. 3, 1933 |
| 1,333,772 | Payne | Mar. 16, 1920 |
| 1,682,878 | Willi | Sept. 4, 1928 |
| 1,874,162 | Benoit | Aug. 30, 1932 |
| 1,949,986 | Whalley | Mar. 6, 1934 |
| 2,062,451 | Forster | Dec. 1, 1936 |
| 2,284,989 | Rue | June 2, 1942 |
| 2,344,567 | Sidebotham | Mar. 21, 1944 |
| 2,413,315 | Darrogh | Dec. 31, 1946 |
| 2,598,920 | Keith | June 3, 1952 |
| 2,652,968 | Bolding | Sept. 22, 1953 |
| 2,660,361 | Tyrseck | Nov. 24, 1953 |
| 2,704,617 | Stieve | Mar. 22, 1955 |
| 2,807,389 | Strauss | Sept. 24, 1957 |

FOREIGN PATENTS

| | | |
|---|---|---|
| 59,545 | Norway | June 27, 1938 |
| 462,374 | Canada | Jan. 10, 1950 |